United States Patent [19] [11] Patent Number: 4,739,143
Sakai et al. [45] Date of Patent: Apr. 19, 1988

[54] DISCHARGE MACHINING APPARATUS WITH WIRE ELECTRODE REVERSAL

[75] Inventors: Yozo Sakai; Yuichiro Haishi, both of Aichi, Japan

[73] Assignee: Mitsubishi Denki Kabushiki Kaisha, Tokyo, Japan

[21] Appl. No.: 739,578

[22] Filed: May 28, 1985

[30] Foreign Application Priority Data

May 28, 1984 [JP] Japan ................................. 59-106493

[51] Int. Cl.⁴ .............................................. B23H 7/02
[52] U.S. Cl. .................................. 219/69 W; 204/206; 219/69 R
[58] Field of Search ..................... 219/68, 69 R, 69 M, 219/69 W; 204/129.1, 129.5, 129.7, 206, 224 M

[56] References Cited

U.S. PATENT DOCUMENTS

| 2,906,853 | 9/1959 | Sibley | 219/69 W |
| 4,193,852 | 3/1980 | Inoue | 219/69 W |
| 4,301,349 | 11/1981 | Inoue | 219/69 W |
| 4,353,785 | 10/1982 | Inoue | 219/69 W |
| 4,438,312 | 3/1984 | Inoue | 219/69 W |
| 4,485,288 | 11/1984 | Schneider | 219/69 R |
| 4,629,855 | 12/1986 | Inoue | 219/69 W |

FOREIGN PATENT DOCUMENTS

| 2440564 | 8/1974 | Fed. Rep. of Germany . |
| 2825868 | 6/1978 | Fed. Rep. of Germany . |
| 3030155 | 8/1980 | Fed. Rep. of Germany . |
| 3034483 | 9/1980 | Fed. Rep. of Germany . |
| 3122205 | 6/1981 | Fed. Rep. of Germany . |
| 53-13292 | 2/1978 | Japan | 219/69 W |
| 178619 | 11/1982 | Japan | 219/69 W |
| 315557 | 10/1971 | U.S.S.R. | 219/69 W |
| 709305 | 1/1980 | U.S.S.R. | 219/69 W |

OTHER PUBLICATIONS

American Machinist, vol. 124, No. 11, Nov. 1980, pp. 197-198.

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

To simultaneously machine a plurality of workpieces, 6, 6a a continuous wire electrode 2 supplied by a feed unit 1 is reversed by a pulley 21 below the movable mounting table 7 after passing down through one of the workpieces, and led back up through the other workpiece to a tensioning takeup unit 11. The wire electrode runs 2, 2a are maintained parallel by upper guides 3, 3a secured to a common mounting plate 20, and relative movement between the electrodes and workpieces is controlled to discharge machine identical configurations in both of them.

8 Claims, 6 Drawing Sheets

DISCHARGE MACHINING APPARATUS WITH WIRE ELECTRODE REVERSAL

BACKGROUND OF THE INVENTION

This invention relates to a wire electrode discharge machining apparatus for simultaneously machining a plurality of workpieces into the same configuration with a single wire electrode.

FIG. 1 is a perspective view of a conventional wire electrode discharge machining apparatus, wherein reference numeral 1 designates a wire electrode feed unit, 2 is a wire electrode fed by the unit 1, 3 is an upper guide for the electrode, 4 and 5 are X and Y axis drive units for moving the guide 3, 6 is a workpiece, 7 is a movable table for the workpiece, 8 and 9 are X and Y axis drive units for moving the table 7, 10 is a lower guide for the electrode which extends vertically through the workpiece, and 11 is a receiving or takeup unit which maintains tension on the wire electrode. A supply voltage is applied between the electrode 2 and the workpiece to cause electric discharge therebetween, to thereby cut or machine the workpiece 6. The drive units 4, 5, 8 and 9 move the electrode 2 and the workpiece relative to each other.

When a plurality of workpieces 6, 6a, 6b are to be cut into the same configuration simultaneously, they may be stacked on the movable table 7 as shown in FIG. 2 and then cut in the same manner as described with reference to FIG. 1.

In another arrangement as shown in FIG. 3, a plurality of workpieces 6, 6a (only two shown for simplicity) are mounted on a movable table 7, and feed units 1 and 1a, wire electrodes 2 and 2a, upper guides 3 and 3a, lower guides 10 and 10a and takeup units 11 and 11a equal to the number of workpieces are provided to form a plurality of machining apparatuses with a common movable table. Such apparatuses are operated in the same manner in a real time mode, to thus cut the workpieces simultaneously.

The FIG. 2 method of stacking the workpieces is disadvantageous in that when the workpieces have irregular or bump surfaces gaps are formed between them, as a result of which they are not sufficiently electrically connected to one another and metal powder to be discarded falls into the gaps, thus causing secondary electric discharge. Owing to such secondary discharge the wire may be cut or bent, which results in machining inaccuracies and non-uniformity. Further, when box-shaped workpieces are stacked they are initially clamped together on four sides as shown in FIGS. 4(a) and 4(b). As the machining progresses, however, the number of sides still clamped decreases, as a result of which the workpieces are gradually bent or tilted.

The FIG. 3 method involving a plurality of discharge machining apparatuses is also disadvantageous owing to the intricate construction and high manufacturing cost, and their operations are also difficult to accurately control.

SUMMARY OF THE INVENTION

In accordance with the present invention these drawbacks and disadvantages of the prior art are effectively overcome by providing pulley means disposed either above or below a movable table mounting separated workpieces for reversing the direction of feed or advance of the wire electrode such that, in the case of two workpieces, the electrode wire passes vertically down through one and up through the other in a parallel fashion. A pair of upper guides spaced apart a distance equal to the separation between the parallel runs of the continuous wire electrode are preferably mounted on a common plate member driven in the X and Y directions, to thereby ensure fully identical configurations of the machined workpieces.

DETAILED DESCRIPTION OF THE PREFERERED EMBODIMENTS

Figure 2:
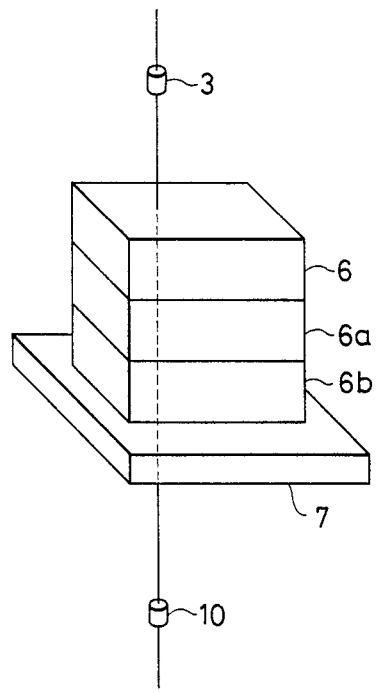
FIG. 2 is a partial schematic perspective of a conventional technique for discharge machining a plurality of workpieces.
Figure 1:
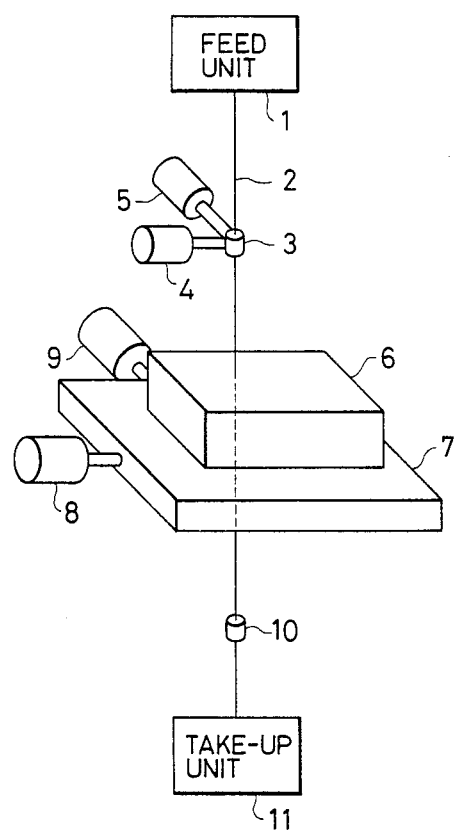
FIG. 1 is a schematic perspective of a conventional wire electrode discharge machining apparatus.
Figure 3:
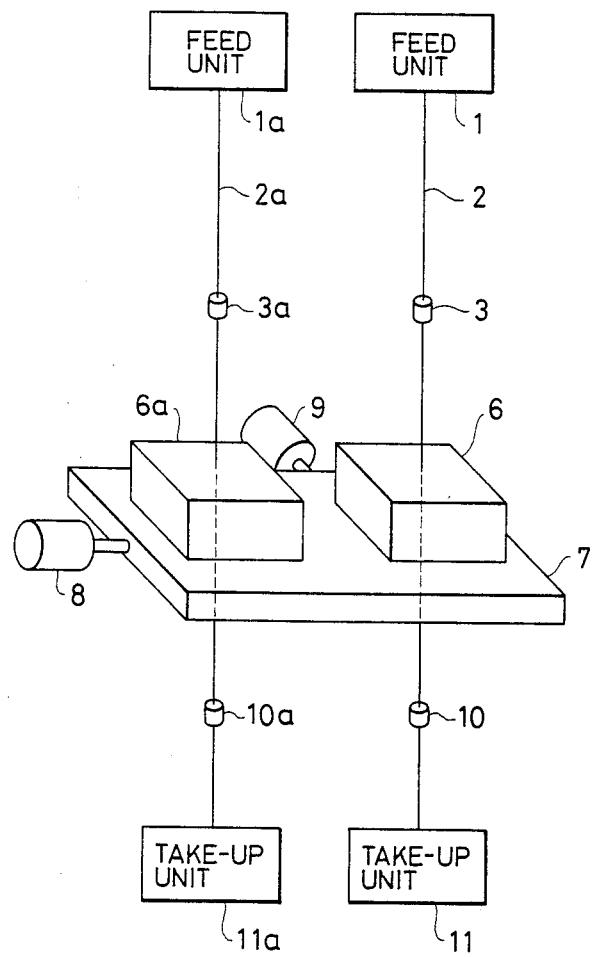
FIG. 3 is a schematic perspective of a further conventional arrangement for simultaneously machining a plurality of workpieces.
Figure 4A:
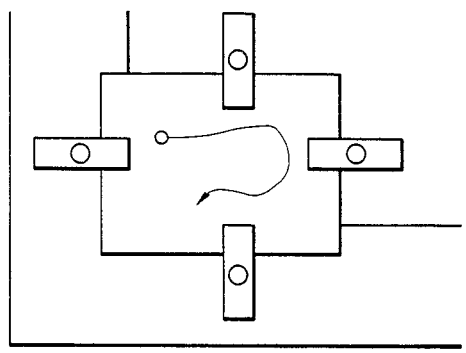
FIGS. 4(a) and 4(b) are a plan view and a side view, respectively, showing a plurality of workpieces stacked and clamped together for conventional machining.
Figure 4B:
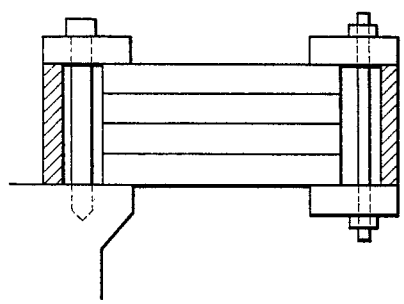
Figure 5:
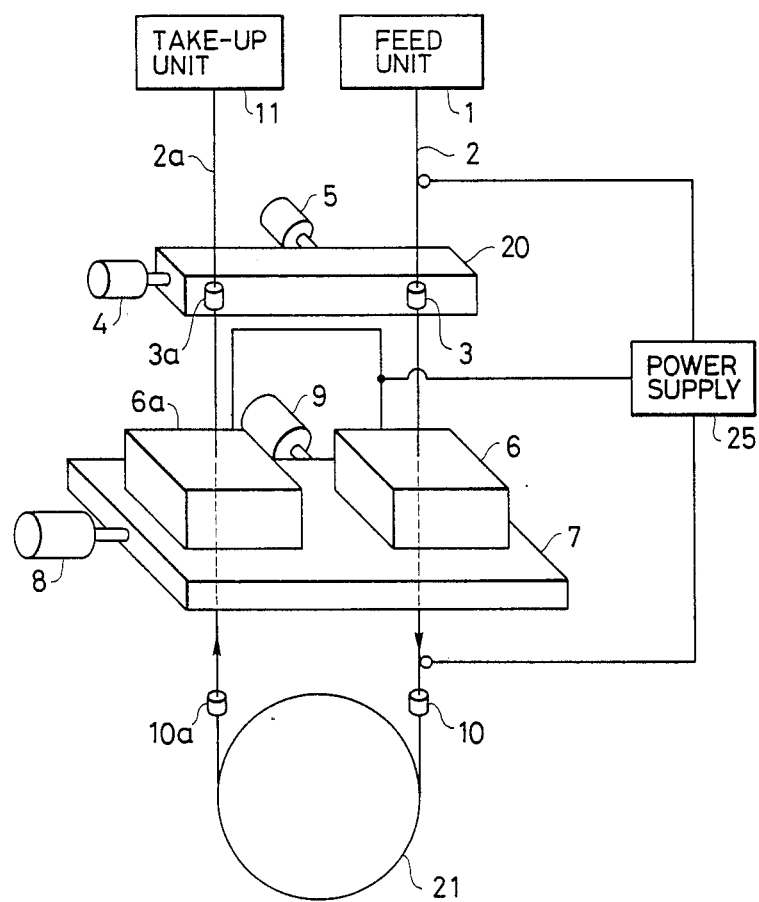
FIG. 5 is a schematic perspective of a first embodiment of a wire electrode discharge machining apparatus for a plurality of workpieces according to this invention.

In FIG. 5 those components which have been described in FIGS. 1 through 3 are designated by the same reference numerals or characters. Further in FIG. 5, reference numeral 20 designates a mounting plate to which a plurality of upper guides 3 and 3a are secured, and 21 is a reversing unit comprising a pulley for reversing the running direction of the wire electrode. Similarly as in the case of the upper guides 3 and 3a, a plurality of lower guides 10 and 10a are provided. In this discharge machining apparatus, unlike the conventional ones, the wire electrode receiving or takeup unit 11 is provided on the same side of the feed unit 1 with respect to the workpieces 6 and 6a, owing to the wire electrode direction reversal by the pulley 21.

In the apparatus thus constructed, the wire electrode 2 supplied by the feed unit 1 is guided by the upper guide 3 secured to the mounting plate 20, passed down through the workpiece 6 vertically, and guided by the lower guide 10. The direction of advancement of the wire electrode is then reversed by the pulley 21, whereafter it is guided by the other lower guide 10a, passed up through the other workpiece 6a from below, guided by the other upper guide 3a, and tensioned by the takeup unit 11.

A power source 25 applies a machining voltage between the wire 2 and the workpiece 6 and between the wire 2a and the workpiece 6a to cause electric discharge therebetween, the energy of which is utilized to cut the workpieces 6 and 6a. Although a single wire electrode is used it is designated by the two different reference characters 2 and 2a for convenience, and the workpieces are cut with the same discharge energy in a real time mode.

In operation, the mounting plate 20 and the movable table 7 are moved by the drive units 4, 5 and 8, 9 respectively, so that the wire electrodes 2 and 2a and the workpieces 6 and 6a undergo the same relative motion in the X-Y plane. As a result, the workpieces are cut into the same configuration simultaneously.

By controlling the drive units 4 and 5 to move the mounting plate 20, the wire electrodes 2 and 2a can be inclined with respect to the workpieces to implement taper-machining.

Figure 6:
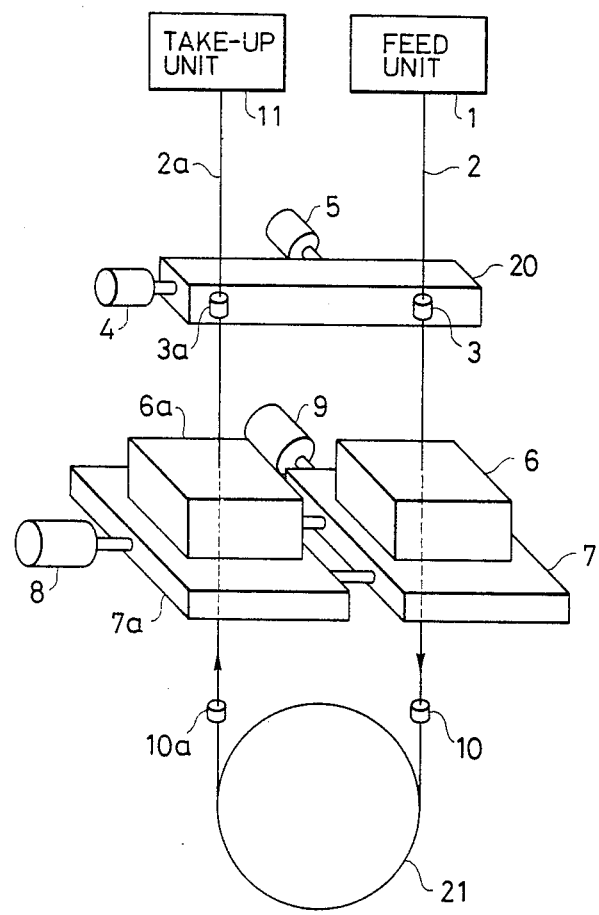
FIGS. 6 and 7 are similar schematic perspectives of second and third embodiments of the invention.

A second embodiment of the invention is as shown in FIG. 6, wherein workpieces 6 and 6a are disposed on separate but rigidly connected movable tables 7 and 7a, respectively. The upper surfaces of the tables 7 and 7a are flush with each other, and they are moved together by drive units 8 and 9 simultaneously.

Figure 7:
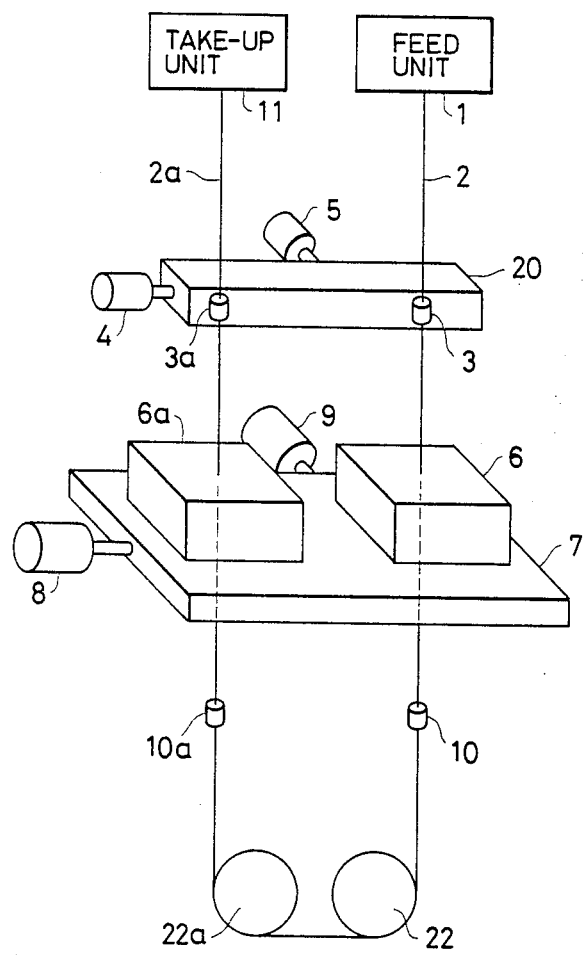

FIG. 7 shows a third embodiment of the invention, wherein two pulleys 22 and 22a are employed to reverse the direction of movement of the wire electrode. The two pulleys are so positioned that the distance therebetween is equal to the distance between the cutting starting positions of the workpieces 6 and 6a. Accordingly, the wire electrodes 2 and 2a can be held most suitably; i.e., they can be held perpendicular to the workpieces.

In the above-described embodiments only two workpieces are machined. However, more than two workpieces can obviously be machined by positioning the pulleys suitably and by disposing the wire electrode receiving uint 11 at an appropriate position on the same side of the feed unit for an even number of workpieces and on the opposite side for an odd number.

The advantages of the present invention in using a single but reversed wire electrode as opposed to using two separate wire electrodes as in the prior art are that a single wire feed device may be commonly used or shared by both runs of the wire to thereby simplify the overall structure of the apparatus, and attendantly reduce its production cost. Further, a used wire electrode which would otherwise be discarded may be reused to thereby reduce the overall electrode consumption. Thus, the present invention offers a greater advantage than that obtained simply by replacing the two wire electrodes with a single wire electrode.

What is claimed is:

1. A wire electrode discharge machining apparatus for simultaneously machining a plurality of workpieces into the same configuration with a single wire electrode, and comprising:
   (a) only a single wire electrode feed unit (1) for feeding a wire electrode (2);
   (b) only a single wire electrode takeup unit (11) for maintaining said wire electrode under a predetermined tension;
   (c) reversing means (21) disposed in the path of said wire electrode between the feed unit and the takeup unit for reversing the direction of advance of said wire electrode;
   (d) table means carrying a first workpiece (6) disposed between said feed unit and said reversing means, and through which said wire electrode penetrates in a first direction;
   (e) said table means also carrying a second workpiece (6a) disposed between said takeup unit and said reversing means, and through which said wire electrode penetrates in the reverse direction;
   (f) a power source (25) for applying voltage between said wire electrode and said first and second workpieces;
   (g) a plurality of relative movement means (4, 5, 8, 9) for moving said table means and said wire electrode so that the relative movement of said wire electrode and said first workpiece is identical to the relative movement of said wire electrode and said second workpiece; and
   (h) a first guide means (3) for guiding said wire electrode from said feed unit to said reversing means; and a second guide means (3a) for guiding said wire electrode from said reversing means to said takeup unit; said first and second guide means being secured to a common mounting plate (20);
   wherein said table means comprises two movable tables (7, 7a) whose upper surfaces are coplanar and on which said first and second workpieces are respectively carried; and
   wherein two of said relative movement means are adapted to move said mounting plate in an X-Y plane.

2. An apparatus as claimed in claim 1, in which said reversing means is a pulley.

3. An apparatus as claimed in claim 2, in which said pulley is relatively large in diameter.

4. An apparatus as claimed in claim 1, in which said reversing means is two pulleys relatively small in diameter.

5. An apparatus as claimed in claim 4, in which said two pulleys are disposed in correspondence to a distance between machining starting positions of said first and second workpieces.

6. An apparatus as claimed in claim 1, in which said table means is in a horizontal plane, and said wire electrode penetrates said first and second workpieces vertically.

7. An apparatus as claimed in claim 1, wherein said first and second guide means are located between said table means (7) and said feed unit (1) and said takeup unit (11), respectively; and further comprising a third guide means (10) for guiding said wire electrode from said feed unit to said reversing means, and a fourth guide means (10a) for guiding said wire electrode from said reversing means to said takeup unit, said third and fourth guide means being located between said table means and said reversing means (21).

8. An apparatus as claimed in claim 1, in which two other of said relative movement means are adapted to move said table means in an X-Y plane.

* * * * *